United States Patent [19]

Haar et al.

[11] Patent Number: 4,572,979
[45] Date of Patent: Feb. 25, 1986

[54] TERMINAL CONNECTIONS AND HOUSING FOR A SMALL ELECTRIC MOTOR FOR WINDSHIELD WIPER

[75] Inventors: Gerhard Haar, Leinfelden; Heinz Jakob; Hans Prohaska, both of Bietigheim-Bissingen; Theodor Schneider, Freudental; Karl-Friedrich Schubert, Bietigheim-Bissingen; Werner Wohrle, Brackenheim-Meimsheim, all of Fed. Rep. of Germany

[73] Assignee: ITT Industries, Inc., New York, N.Y.

[21] Appl. No.: 718,956

[22] Filed: Apr. 2, 1985

Related U.S. Application Data

[63] Continuation of Ser. No. 529,953, Sep. 6, 1983, abandoned.

[30] Foreign Application Priority Data

Sep. 25, 1982 [DE] Fed. Rep. of Germany ....... 3235622

[51] Int. Cl.[4] ............................................. H02K 11/00
[52] U.S. Cl. .................................... 310/68 R; 310/71; 310/83; 310/239; 310/43
[58] Field of Search ...................... 310/41, 83, 89, 91, 310/71, 239, 246, 238, 68 B, 68 C, 68 R; 318/443; 15/250.3

[56] References Cited

U.S. PATENT DOCUMENTS

| | | | |
|---|---|---|---|
| 3,132,366 | 5/1964 | Brooks | 310/239 X |
| 3,622,822 | 11/1971 | Lofstrand | 310/43 X |
| 4,028,571 | 6/1977 | Dicke | 310/43 X |
| 4,227,104 | 10/1980 | Hamman | 310/83 X |
| 4,398,135 | 8/1983 | Busch et al. | 310/71 X |
| 4,399,380 | 8/1983 | Hirano | 310/83 X |

Primary Examiner—Mark O. Budd
Attorney, Agent, or Firm—Donald J. Lenkszus

[57] ABSTRACT

A windshield wiper motor is disclosed in which there is a gear mechanism in a one piece plastic housing. The gear housing also houses the electrical terminals for the motor brushes and the brush springs. All these elements are placed in the one piece plastic housing.

19 Claims, 11 Drawing Figures

TERMINAL CONNECTIONS AND HOUSING FOR A SMALL ELECTRIC MOTOR FOR WINDSHIELD WIPER

This is a continuation of application Ser. No. 529,953, filed Sept. 6, 1983, now abandoned.

BACKGROUND OF THE INVENTION

This invention pertains to a small electric motor for windshield wipers in motor vehicles. Such motors comprise a cup-shaped motor housing, a gear housing closing one front side of the motor housing by an end shield and having a cup for receiving gear elements, and a plastic receptacle or plug housing, in which are secured connecting contacts connected in an electrically conductive manner with the motor brushes.

The gear housing of small electric motors currently used for windshield wiper installations is made of a metallic material. In most cases it is made by zinc die-casting. Because the receptacle for connecting contacts, which in many cases is formed as a plug housing, has to be of plastic material, the receptacle is produced in a separate phase of operation and secured to the gear housing.

SUMMARY OF THE INVENTION

In an electric motor according to the invention, the gear housing and the receptacle for the connecting contacts are integrally made of plastic material. Thus the small electric motor according to the invention, has a gear housing and a receptacle for the connecting contacts produced as a single constructional unit. This is made in a single phase of operation. Thus both the production and the assembly costs can be reduced. When a plastic material is used instead of the metal zinc, the costs are reduced further. Moreover, the weight of a small electric motor is also considerably reduced by using a plastic material.

Further, a small electric motor in accordance with the invention includes resilient locking arms with a locking element formed in one piece on the end shield of the plastic gear housing and extending in the longitudinal direction of the motor housing. By means of the locking arms, the gear housing is locked on the motor housing. The gear housing and the motor housing can thus be secured to each other in a very simple manner without additional parts like clips, screws and sliders. A locking recess may be provided in the motor housing as an aperture which makes it possible to affect the locking arms from the outside so that gear housing and motor housing can be easily separated from each other.

The gear housing may advantageously consist of a thermoplastic plastic. Such a plastic material can very well endure the stresses within the gear housing.

A brush plate in the motor housing is directly connected with the end shield of the plastic gear housing. The rubber nipples which have been previously used can be completely eliminated so that the assembly time is considerably reduced. Automatic mounting of the brush plate is also possible. If the brush plate is made of a duroplastic plastic material, the tubular brush holders for the brushes of the electric motor can be formed in one piece with the brush plate, because the duroplastic plastic is not deformed, even when the brushes are heated up, therefore, it is ensured that the brushes can move in their tubular brush holders. A direct locking of a brush plate on the gear housing consisting of plastics material is further advantageous when the gear housing and the receptacle for the connecting contacts are not made in one piece.

In one embodiment of the invention, tubular brush holders are made of metal and are directly secured to the end shield of the gear housing consisting of plastics material. The gear housing consists of a thermoplastic material and are advantageously fitted on studs projecting from the end shield so that the brushes of the motor commutator are positioned at the same level that they would be where a brush plate is used.

A small electric motor according to the invention may be further advantageously developed in that the shaft of the electric motor is mounted in the end shield and spaced apart from the end shield in a bearing bore which is provided in a wall of the gear housing. The bore is closed towards the outside by material fitted in one piece on the gear housing. In this manner a twofold support of the motor shaft in the gear housing is achieved and offers additional advantages. Because the bore in the gear housing wall has to be closed it is necessary to form it by a tool portion extending through the end shield and pulled back through it upon deforming.

It is thereby ensured that the bearing receptacle in the end shield and the bearing bore occupy a fixed position relative to each other. Because the additional bearing bore is formed as a pocket hole, no additional closing parts are necessary.

An electric motor in accordance with the invention is advantageously developed such that from the connecting contacts within the cup-shaped gear housing portion leads are conducted to the end shield. Interference suppression means connected with these leads are positioned in the cup-shaped gear housing portion. Thus leads and interference suppression means are accomodated in a protected manner. The receptacle for the connecting contacts and the plug housing respectively is thereby preferably positioned on the surface of the cup-shaped gear housing portion.

Each lead may be integrally formed with the assigned connecting contact out of a single sheet of metal. This is advantageous when the leads extend at different levels beside one another from the connecting contacts to the end shield. If connecting contacts formed as plugs and/or the ends of the leads are to be made thicker in comparison with the leads, this can be achieved by means of sheet metal portions, which in the punched-out, planar condition of the sheet metal are positioned beside the plugs and folded.

In accordance with an aspect of the invention, all available connecting contacts and the available leads are punched out with the respective intermediate pieces and are brought into their final position relative to one another by bending themselves and/or the intermediate pieces. Production is thereby simplified and the constructional unit is mounted in the gear housing as a whole and then the various portions are divided at the intermediate pieces. If a position switch with sliding springs is part of an electric motor in accordance with the invention, each of the sliding springs is advantageously integrally formed with an assigned connecting contact. Moreover, the sliding springs, all connecting contacts and the leads are punched out in one piece with the intermediate pieces. The intermediate pieces are preferably positioned between the connecting contacts.

BRIEF DESCRIPTION OF THE DRAWINGS

The invention may be better understood from a reading of the following detailed description of several embodiments in conjunction with the drawings in which.

DETAILED DESCRIPTION

Figure 1:
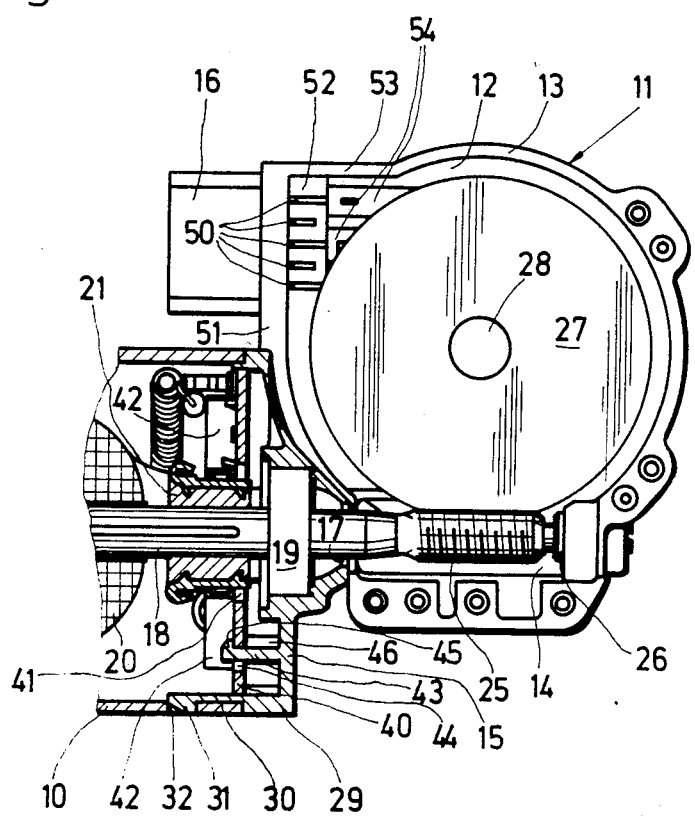
FIG. 1 is a top view partially in section of a small electric motor according to the invention, in which the gear housing is of plastic material and is locked to the motor housing.

The small electric motor shown in FIG. 1 comprises a motor housing 10 and a gear housing 11. The motor housing is cylindrically shaped, like a cup, and is rolled from sheet steel. The gear housing 11 is also as substantially a cup-shaped receptacle. The cup-shaped gear housing portion 12, whose open side can be closed by a cover (not shown in FIG. 1) rests upon the rim 13. A cylinder 14 is tangentially arranged on the cup-shaped gear housing 12 and extends in the longitudinal direction of the motor housing 10 and opens toward the cup-shaped gear housing portion and towards the cover. An end shield 15, which is laterally arranged on the cup-shaped gear housing portion 12 and whose outside diameter is the same as the outside diameter of the motor housing 10 and which closes the front side of this housing, and a plug housing 16 are integrally formed on the surface of the cup-shaped gear housing portion 12.

In the center of the end shield 15 is a passage 17 for the armature shaft 18. A cylindric recess facing the motor housing 10 is formed concentric to passage 17. A ball bearing 19 is inserted in the recess and has its inner ring pressed onto the armature shaft 18. Within the motor, the armature shaft 18 carries a laminated core, not shown in detail, armature windings 20 and a commutator 21. The armature shaft 18 projects into the cylinder 14 of the gear housing 11 and is formed as a worm 25 gear therein. The front side of the armature shaft 18 rests upon a screw 26, which is inserted into the cylinder from the front side and by which the axial play of the armature can be adjusted. The worm gear 25 meshes with a worm wheel 27, which is accomodated in the cup-shaped gear housing portion 12 and is connected with an output shaft 28 in a manner protected against twisting. The output shaft 28 is rotatably mounted in the cup-shaped gear housing portion 12. Worm gear 25 and worm wheel 27 reduce the revolutional speed of the armature shaft 18 to a revolutional speed of the output shaft 28 which is appropriate for operating a windshield wiper installation.

The end shield 15 and the motor housing 10 can be easily assembled in a cost saving manner by a locking arrangement. For this purpose the end shield 15 is provided with a circumferential collar 29 resting upon the front side rim of the motor housing 10. Locking arms 30 are distributed in a circumferential direction on collar 29. Locking arms 30 extend in the longitudinal direction of the motor housing 10. The entire gear housing 11 is made of thermoplastic plastic material, so that the locking arms 30 have a spring-like quality. Locking arms 30 extend along the inside of the motor housing 10 and have a detent 31 which engages in an aperture 32 of the motor housing 10. To assemble the motor housing 10 and gear housing 11 to each other it is thus only necessary to put the end shield 15 onto the motor housing 10. The arms 30 with their detent 31 engage in the apertures 32, so that a firm connection is achieved without further assembly steps. To separate motor housing 10 and gear housing 11 the locking arms 30 can be bent backwards through the apertures 32 so that they do not engage the apertures 32.

A brush plate 40 is arranged within the motor housing 10 at about the level of the rim of the motor housing 10 adjoining the end shield 15 and parallel to the end shield 15. The brush plate 40 has substantially the shape of a ring disc into whose large central opening 41 the commutator 21 projects. Several tubular brush holders 42 are integrally formed with the brush plate on the side of the brush plate 40 facing the armature windings 20. Each brush holder 42 accommodates a carbon brush sliding on the outer surface of the commutator 21. The carbon brushes must be easily displaceable in the tubular brush holders. To ensure this displaceability even when considerable heat is developed, the brush plate 40 and tubular brush holders 42 are made of a duroplastic plastic material. A duroplastic plastic material does not deform when it is heated up, so that the shape of the tubular brush holders 42 is retained and thus the movability of the carbon brushes is ensured.

The brush plate 40 is also secured to the end shield 15 by a locking connection. For this purpose locking arms 43 are integrally formed on the end shield 15 and extend through a respective opening 44 and grip behind this opening with a detent 45. The side of brush plate 40 facing the end shield 15 rests upon studs 46 of the end shield 15. Studs 46 extend in the same direction as the locking arms 43, so that the brush plate has a firm fit between the detents 45 of the locking arms 43 and the studs 46. In the embodiment shown in FIG. 1 the detents 31 and 45 on the locking arms 30 and 43, respectively, are formed in a way as to permit their holding surfaces to be positioned in parallel to the corresponding counter surfaces in the motor housing and on the brush plate 40 respectively. The surfaces on the detents can also be inclined to an extent that they form an angle with the counter surfaces, so that they only rest against one edge of the counter surfaces and a force is exerted which presses the motor housing 10 and the brush plate 40 against the end shield.

The plugs 50 are locked in a wall portion 51 of the surface of the cup-shaped gear housing portion 12. The wall portion 51 extends parallel to the end shield 15. The plugs 50 project into a rectangular bulge 52 of the cup-shaped gear housing portion 12, which is formed by the wall portion 51 and a further portion 53 which is perpendicular the wall portion 51.

A sliding spring 54 is force fit on each of three of the plugs 50. Together with a contact disc the sliding springs 54 form a limit switch on the covered side of the worm wheel 27. This limit switch ensures that the windshield wipers are switched off in their end positions, when the windshield wiper installation is switched off.

FIGS. 2 to 7 illustrate a second embodiment of the gear housing 11. The basic construction of this gear housing comprises a cup-shaped gear housing portion 12 for a worm wheel, a cylinder 14 tangentially positioned to the cup-shaped gear housing portion 12, which cylinder accomodates a worm gear, an end shield 15, and a plug housing 16.

Figure 3:
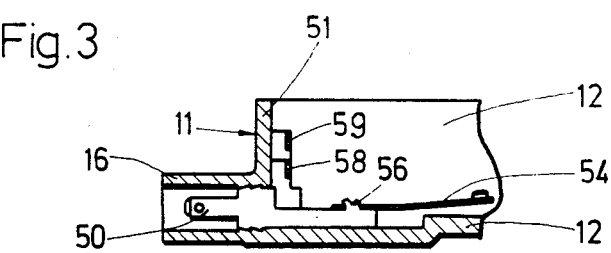
FIGS. 3 and 4 are cross sectional views taken long the lines III—III and IV—IV of FIG. 2, respectively.
Figure 2:
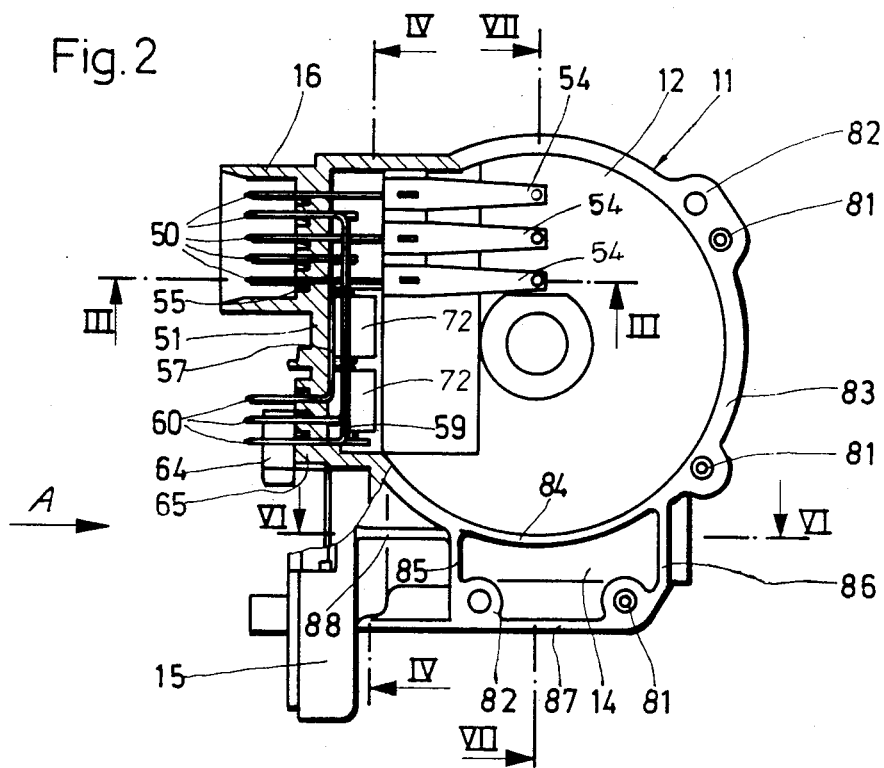
FIG. 2 is a second embodiment of a gear housing in a configuration similar to that of FIG. 1.
Figure 5:
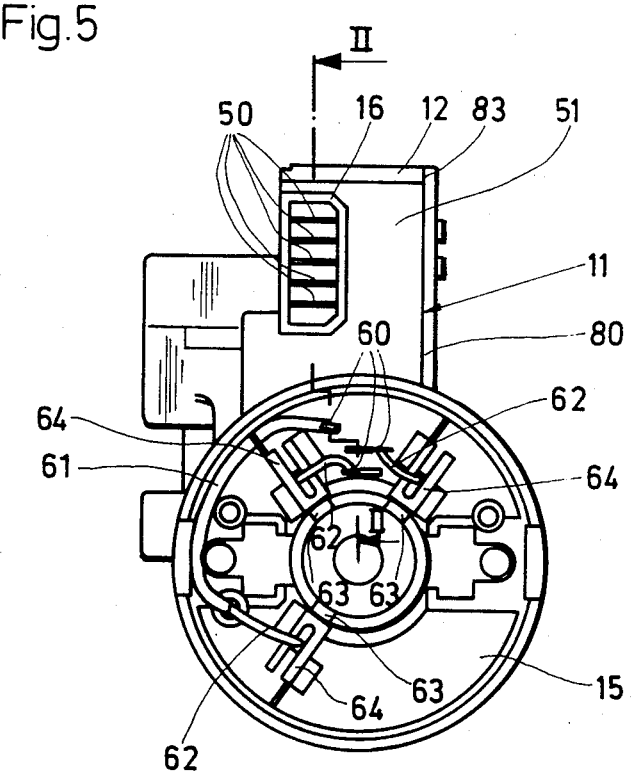
FIG. 5 is a view of the gear housing according to FIG. 2 in the direction of arrow A in FIG. 2.

One can see from FIGS. 2 and 3 that the plugs 50 are secured in the wall portion 51 of the cup-shaped gear housing portion 12 by their serrated lateral edges and by a detent 55, which is cut out of the plugs. FIG. 3 shows particularly clearly how a stud of the two outer plugs 50 and the center plug extends through and is force fit to the sliding springs 54. Seen from the end shield 15 leads 57, 58 and 59 which are integrally punched out with the respective plug 50 are conducted from the first, second and fourth plug to the end shield in parallel to the wall portion 51 and are inserted into the end shield 15 with their ends formed as plugs 60 extending in the same direction as plugs 50. As shown in FIG. 5, the pigtails 62 of three carbon brushes 63 are connected with the plugs 60, partly via an intermediate lead 61. The carbon brushes 63 are accomodated in metallic tubular brush holders 64 fitted on studs 65 of the end shield 15 as shown in FIG. 2. The studs project to the inside, so that the carbon brushes occupy the same position as if there were a brush plate.

Figure 4:
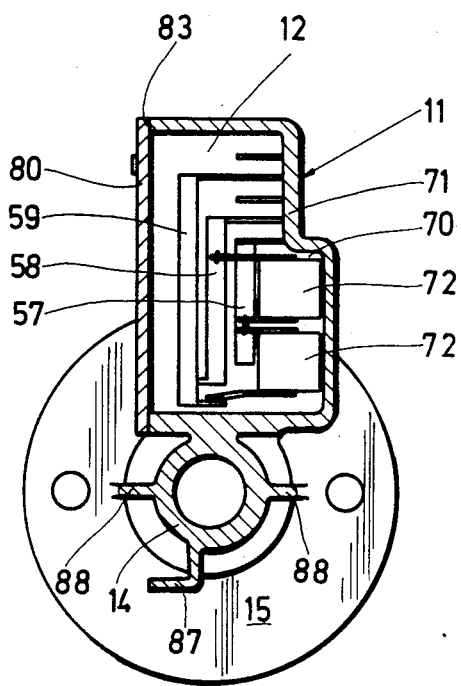

As shown in FIGS. 2 and 3, the three leads 57 to 59 extend at different levels of the wall portion 51 of the cup-shaped gear housing portion 12. The lead 57 extending from the first plug 50 is closest to the bottom of the cup-shaped gear housing portion and is followed by the lead 58 extending from the second plug and the uppermost lead is the lead 59 extending from the fourth plug 50. As shown in FIG. 4, below the leads 57 to 59 in a pocket 70 of the bottom 71 of the cup-shaped gear housing portion 12 are positioned two capacitors 72 for interference suppression. Both capacitors have one terminal connected to the lead 72 and their second terminals connected to the leads 58 and 59 respectively. By having different spacings of the leads from the wall portion 51, it is ensured that the capacitor terminals do not touch any leads other than those desired. As described hereinabove, ends 60 of the leads 57 to 59 extend in the same direction as the plug 50. This permits easy assembly, because the mounting direction of the parts is the same.

Figure 6:
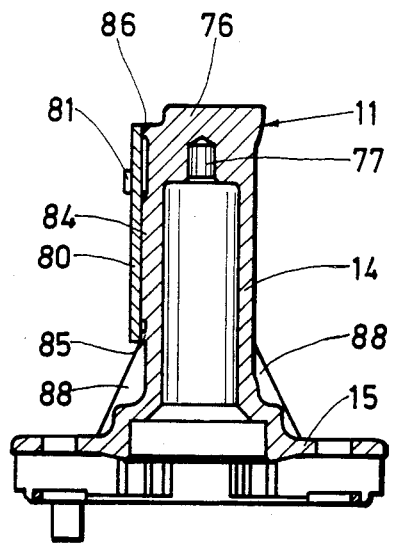
FIGS. 6 and 7 are cross sectional views taken on the lines VI—VI and VII—VII of FIG. 2, respectively.
Figure 7:
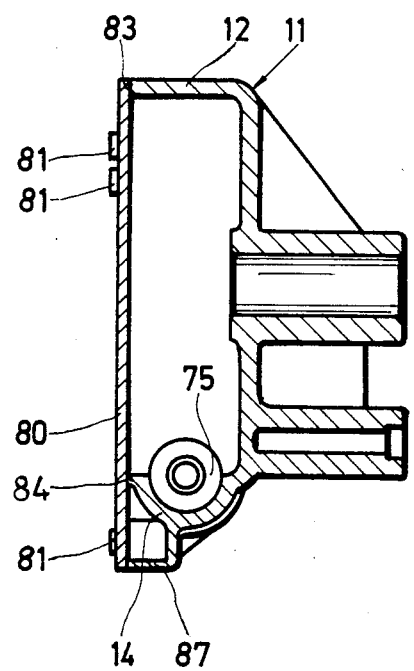

As seen from FIGS. 6 and 7 and in contrast to the embodiment of FIG. 1, the cylinder 14 which extends tangentially to the cup-shaped gear housing portion and perpendicular to the end shield 15 is closed nearly everwhere. Only towards the cup-shaped gear housing portion 12 it has an aperture 75, whose rim is the intersection line between the cup-shaped gear housing portion 12 and the cylinder 14. Such a design of the cylinder 14 can be simply achieved if it is deformed in the same direction as the inner side of the end shield 15 facing the motor housing 10. The front side of the cylinder 14 not facing the end shield 15 can then be closed by a wall 76 formed in one piece with the gear housing 11. In wall 76 is located a bearing bore 77 closed towards the outside. In the bearing bore 77 a worm shaft can be supported on a bearing pin. Thus the motor shaft of a small electric motor comprising a gear housing according to FIGS. 2 to 7 is supported in the gear housing 11 in a twofold manner, namely in the end shield 15 and in the wall 76. Thereby the bearings are not subject to tolerance deviations and can be adjusted to each other very exactly, because they are formed by the same tool section.

As is especially clear from FIG. 7 a cover 80 (which has been omitted in FIGS. 2 and 3) closing the cup-shaped gear housing portion 12 extends transversally across the cylinder 14 and is held on the gear housing 11 beyond the cylinder 14 by a fastening eye 81. Beyond the cylinder 14 there is provided a second fastening eye 82 shown in FIG. 2 for screwing on the cover 80 after a demounting action. Additional fastening eyes 81 and 82 are distributed over the circumference of the cup-shaped gear housing portion 12. The upper rim 83 of the cup-shaped gear housing portion upon which the cover 80 rests is continued in a portion 84 in the area of the cylinder 14 within the outer contour of the cover 80. This design contributes to closing the interior of the cup-shaped gear housing portion 12 properly to the outside and to increase the stability of the gear housing 11. The rim portion 84 ends in two places as shown in FIGS. 2 and 6 in each of which a rib 85 or 86 extends from the cup-shaped gear housing portion to the outside. These ribs are part of a train of ribs and extend perpendicularly to the longitudinal direction of the cylinder 14 and across this cylinder. Beyond the cylinder 14 the two ribs 85 and 86 are interconnected by a third rib 87, which has an angular shape. Two of the fastening eyes 81 and 82 are located in the corners in which the ribs 85 or 86 and the rib 87 meet. The free rim of the ribs 85 and 87 is flush with the rim 83 of the cup-shaped gear housing portion 11. Because the ribs 85 to 87 also run along the outer edge of the cover 80, the latter rests upon the ribs mentioned.

The ribs 88 also serve to strengthen the gear housing 11. These ribs descend in a slanting manner from the cylinder 14 to the end shield 15. In addition the rib 87 is elongated beyond the transversal rib 85 as far as to the end shield 15.

Figure 8:
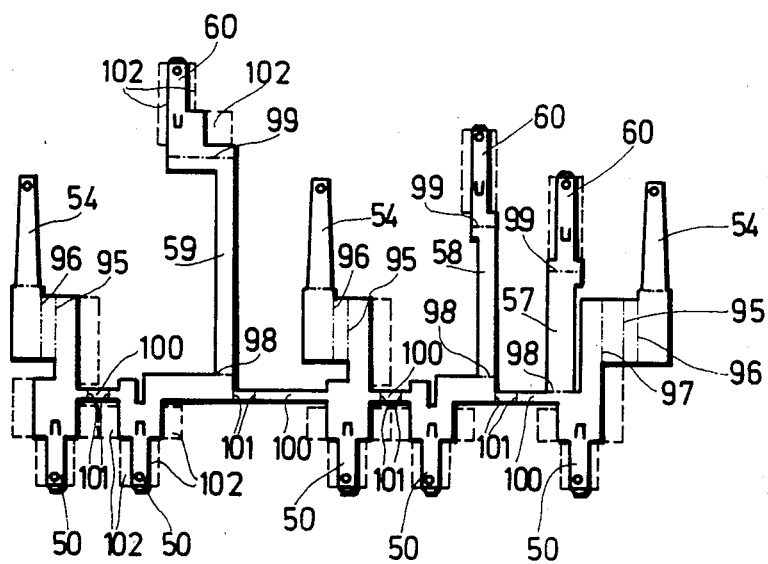
FIG. 8 is a constructional unit in planar view of plug connections, leads, plug-ends of the connecting leads and sliding springs of a position switch integrally punched out.
Figure 9:
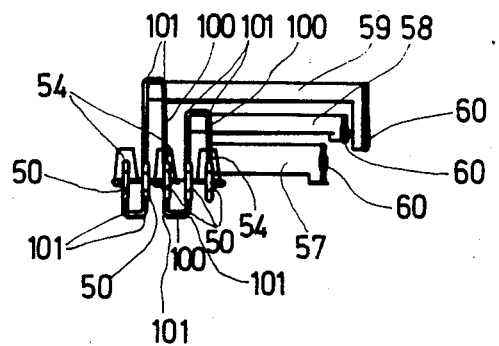
FIG. 9 is the constructional unit according to FIG. 8 in folded condition, not yet divided.

In the embodiment according to FIGS. 2 to 7, each plug connection 60 and possibly the lead 57, 58 or 59 assigned to it is punched out of a sheet metal as a piece part. The sliding springs 54 are later secured to the respective plugs 50. FIGS. 8 and 9 show how in contrast thereto all plugs 50, the leads 57, 58 and 59 with their plug ends 50 and all sliding springs 54 are punched out of a sheet metal billet and the various portions can be brought into the proper position relative to each other by folding. The entire constructional unit is composed of various structural components of which each comprises a plug connection 50 and either a sliding spring 54 or a lead 58 or 59 or a lead 57 and a sliding spring 54. The two structural components comprising a plug 50 and a sliding spring 54 are built completely identical. Viewing the constructional unit in the direction of the plugs 50, the sliding springs 54 of these two structural units have to be folded by 90 degrees in counter clockwise direction about the bending edge 95 indicated by dash-dotted lines and by 180 degrees in clockwise direction about the bending edge 96 also shown by dash-dotted lines, so that they occupy their proper position relative to the assigned plugs 50. Because in a structural component consisting of a plug 50, the lead 57 and a leaf spring 54, the sliding spring 54 due to the lead 57 is positioned on the other side of the plug 50 as compared with the two structural components described above, in addition to the two foldings about the bending edges 95 and 96, a further bending by 180 degrees about the bending edge 97 in counterclockwise direction is necessary in order to bring the sliding spring in its position. Each of the leads 57, 58 and 59 are folded by 90 degrees and in the same direction about the bending edges 98 and 99. As seen in FIG. 8 the bending edge 98 of the lead 57 is closer to the front end of the assigned plug 50 than the bending edges 98 of the leads 58 and 59. In this manner the different spacings from the wall portion 51 of the cup-shaped gear housing portion 12 of FIGS. 2 to 7 are achieved for the lead 57 and the leads 58 and 59 respectively. If it is intended that all leads 57 to 59 have the same spacing from a wall portion 51 it is only necessary that all bending edges 98 be on a straight line.

The individual structural components of the constructional unit of FIG. 8 are interconnected by intermediate pieces 100, which are arranged between the plugs 50 and located on a straight line. The individual structural components have to be swivelled relative to each other by a total of 180 degrees about two bending edges 101 each in the intermediate pieces, in order to bring them into the positions relative to each other they are intended to occupy in the gear housing. The constructional unit of FIG. 9 is shown in this state. When the material thickness of the plugs 50 and 60 is to be greater than that of the sliding springs 54 and the leads 57, 58 and 59, this can be achieved by additional sheet metal portions 102 which in the planar condition of the constructional unit are located beside the plugs and are folded by 180 degrees onto these plugs. The sheet metal portions 102 have been indicated in FIG. 8 by broken lines. In FIG. 9 the constructional unit is shown in a way as if the sheet metal portions 102 were available. In FIG. 8 the sheet metal portions mentioned of only one structural component have reference numerals. It is advantageous, when sheet metal portions 102 are provided on both narrow sides of a plug and when they are half as wide as a plug and each folded in opposite directions by 180 degrees onto the same broadside of a plug.

A constructional unit according to FIG. 9 with structural components brought into the proper positions relative to each other is as a whole inserted into a gear housing of a small electric motor. This can be effected automatically. Directly after the assembly, the various structural components are divided at the intermediate pieces, so that they are no longer electrically connected with each other. Thus the assembly is very simple and economical.

Figure 10:
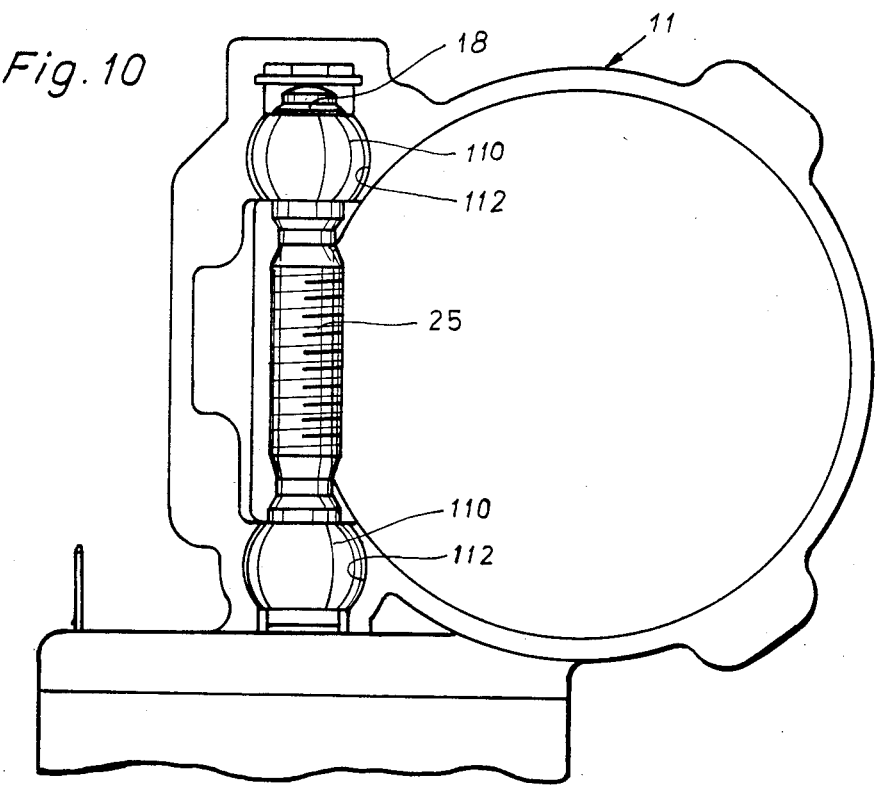
FIG. 10 is a top view of a gear housing with two bearings.
Figure 11:
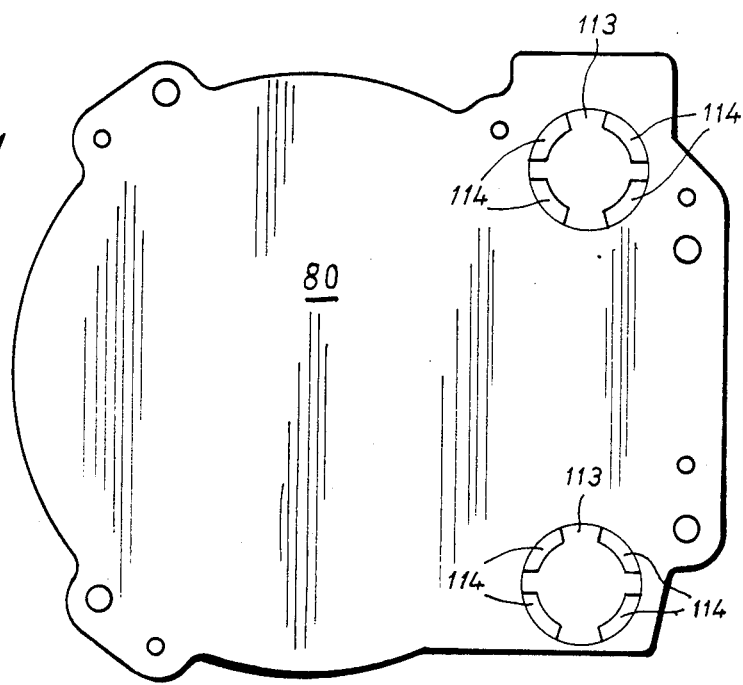
FIG. 11 is a top view on the inside of a cover being part of the gear housing according to FIG. 10.

The embodiment according to FIGS. 10 and 11 provides good dissipation of heat generated by the two cup-shaped bearings 110 of the motor shaft 18, which bearings are arranged in the gear housing 11. The shaft is guided only via the two cup-shaped bearings which are positioned in the gear housing 11 equidistant from the point of action between the worm gear 25 and a worm wheel not shown in the drawing. The cups 110 lie in two-piece ball cups divided in the longitudinal direction of the shaft 18. One half 112 of the ball cups is obtained by forming the plastics gear housing 11 appropriately.

The other halves 113 of the ball cups are provided on the cover 80, which covers the gear housing 11. They are clipped into the cover and each of them has four resilient segments 114 which lap over the cups 110 and 111 respectively.

So that heat generated at the bearings is properly carried away, the halves 113 of the ball cups are at least partly made of metal, so that they serve as good heat bridges between the bearings 110 and 111 and the metal cover 80. The halves 113 can be entirely made of metal or of a plastic-metal combination.

What is claimed is:

1. A small electric motor for windshield wiper installations, comprising:
   a cup-shaped motor housing;
   a gear housing having an end shield closing one front side of said motor housing;
   a cup for receiving gear elements having a pocket in the bottom of said cup;
   interference suppression means positioned in said pocket;
   a plug housing provided laterally of said end shield;
   connecting contacts extending in the longitudinal direction perpendicular to said end shield, said contacts including leads conducted within said cup to said end shield, each said lead and its corresponding connecting contact being made of sheet metal material in one piece and is arranged on a surface portion of said cup, said surface portion extending parallel to said end shield, the ends of said leads being formed as plugs having a longitudinal direction corresponding to the longitudinal direction of the connecting contacts and are inserted into said end shield;
   brushes electrically connected to said connecting contacts and accommodated in said motor housing; and
   said gear housing and said plug housing being integrally formed in one piece of plastic material.

2. An electric motor according to claim 1, comprising resilient locking arms each with a locking element and each integrally formed on said end shield and extending in the longitudinal direction of said motor housing;
   said locking arms lockingly engaging said motor housing.

3. An electric motor according to claim 2, wherein said locking arms extend inside said motor housing.

4. An electric motor according to claim 3, wherein each said locking element comprises a detent on the corresponding locking arms; and said motor housing includes an aperture for engaging each said detent.

5. An electric motor according to claim 1, comprising a brush plate positioned in said motor housing, said brush plate being directly locked with said end shield.

6. An electric motor according to claim 5, comprising integrally formed locking arms on said end shield, said locking arms extending in the longitudinal direction of said motor housing, said locking arms have a locking element and which hold said brush plate.

7. An electric motor according to claim 5, wherein said brush plate is formed of a duroplastic plastic material and comprises tubular brush holders for brushes of the electric motor integrally formed therein.

8. An electric motor according to claim 1, comprising tubular brush holders for said brushes, said brushes being made of metal and directly secured to said end shield.

9. An electric motor according to claim 1 wherein said gear housing includes a wall spaced apart from said end shield having a bore adapted to receive the shaft of said motor, said bore being closed to the outside by a material integrally fitted on the gear housing.

10. An electric motor according to claim 9, wherein said gear housing comprises a cylinder adapted for receiving a worm gear portion of said motor shaft, said cylinder extending tangentially to said cup portion and perpendicular to said end shield, and said cylinder being closed except for an aperture directed towards said cup portion and wherein the rim of said aperture is the intersection line between said cup-shaped gear housing portion and said cylinder.

11. An electric motor according to claim 10, comprising a cover closing said cup portion and projecting transversally beyond said cylinder, said cover being held beyond said cylinder by at least one fastening eye on said gear housing;

said rim rests against said cover and is continued in the area of said cylinder within the outer contour.

12. An electric motor according to claim 1, wherein said plug housing is provided on the surface of said cup portion.

13. An electric motor according to claim 1, wherein said leads extend beside one another at different levels in said cup portion.

14. An electric motor according to claim 1, wherein said connecting contacts and/or the ends of said leads are made thicker in comparison to said leads by means of folded over sheet metal portions.

15. An electric motor according to claim 17, comprising a second sheet metal portion on both longitudinal edges of said connecting contacts and/or the ends of said leads and said sheet metal portion and said second sheet metal portion are folded in opposite directions, so that they are positioned on the same side of a contact.

16. An electric motor according to claim 1, wherein all said connecting contacts and said leads are punched out with intermediate pieces and are brought into their final positions relative to one another by bending themselves and/or the intermediate pieces, that the constructional unit formed thereby is mounted in said gear housing as a whole and then the various portions are divided at said intermediate pieces.

17. An electric motor according to claim 1, comprising sliding springs forming part of a position switch, said springs being integrally formed with an assigned one of said connecting contacts and said sliding springs of said connecting contacts and said leads being punched out in one piece with said intermediate pieces.

18. An electric motor according to claim 1, comprising a cover closing said cup portion, said cover being formed of metal, said cover having a holder for a bearing of the motor shaft, said bearing being arranged in said gear housing and that being at least partly of metal.

19. An electric motor according to claim 21, wherein said holder comprises a plastic material with an admixture of metal.

* * * * *